INVENTOR:
OSCAR HALFDAN JORGENSEN
by
Mead, Browne, Schuyler + Beveridge
Attorneys May 4, 1965     O. H. JORGENSEN     3,181,381
STEPLESSLY VARIABLE POWER TRANSMISSION DEVICES
Filed May 9, 1961     6 Sheets-Sheet 2

INVENTOR:

Oscar Halfdan Jorgensen by

Mead, Browne, Schuyler & Beveridge
Attorneys

May 4, 1965  O. H. JORGENSEN  3,181,381
STEPLESSLY VARIABLE POWER TRANSMISSION DEVICES
Filed May 9, 1961  6 Sheets-Sheet 4

INVENTOR:
OSCAR HALFDAN JORGENSEN
BY
Mead, Browne, Schuyler & Beveridge,
Attorneys May 4, 1965 O. H. JORGENSEN 3,181,381
STEPLESSLY VARIABLE POWER TRANSMISSION DEVICES
Filed May 9, 1961 6 Sheets-Sheet 5

INVENTOR:
OSCAR HALFDAN JORGENSEN
by
Mead, Browne, Schuyler + Beveridge
Attorneys May 4, 1965  O. H. JORGENSEN  3,181,381
STEPLESSLY VARIABLE POWER TRANSMISSION DEVICES
Filed May 9, 1961  6 Sheets-Sheet 6
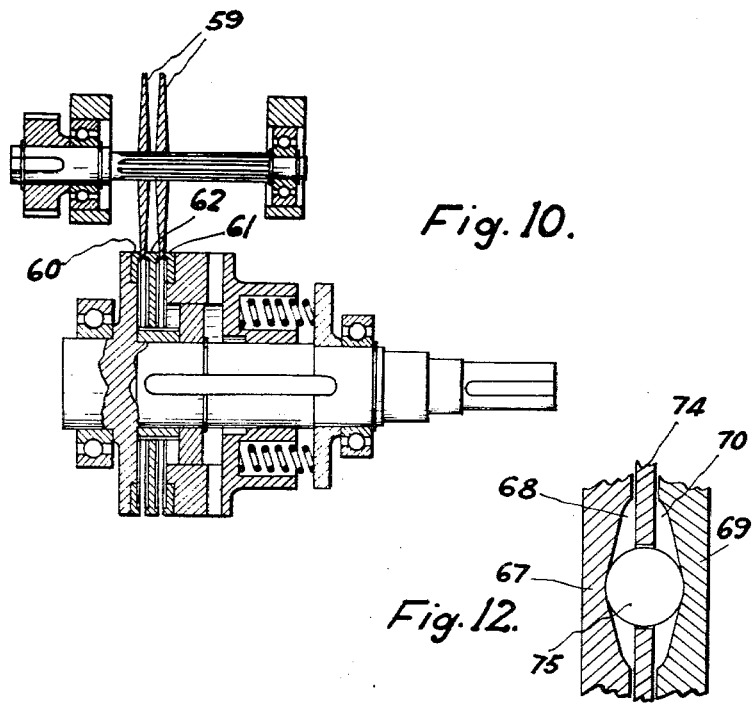
Fig. 10.
Fig. 12.
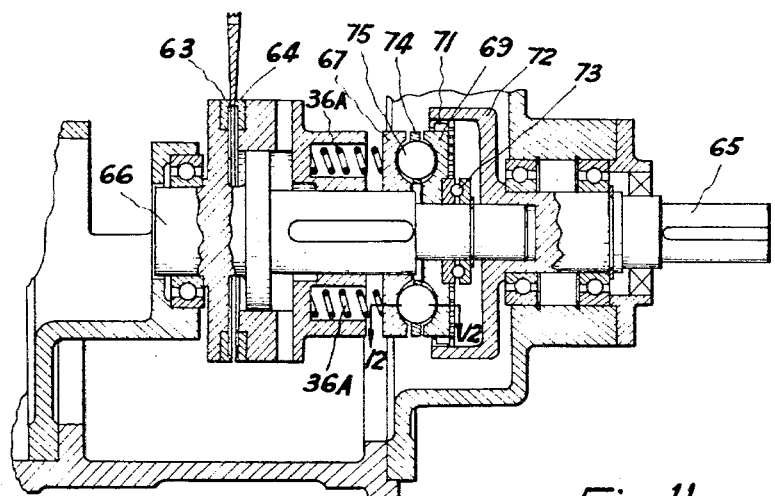
Fig. 11.
INVENTOR;
OSCAR HALFDAN JORGENSEN
by
Mead, Browne, Schuyler & Beveridge
Attorneys United States Patent Office 3,181,381
Patented May 4, 1965

3,181,381
STEPLESSLY VARIABLE POWER TRANSMISSION DEVICES
Oscar Halfdan Jorgensen, "Kyneton," Mona Vale Road, St. Ives, near Sydney, New South Wales, Australia
Filed May 9, 1961, Ser. No. 108,878
Claims priority, application Australia, May 12, 1960, 60,382/60; Oct. 14, 1960, 65,616
5 Claims. (Cl. 74—199)

This invention relates to steplessly variable power-transmission gear units of the kind in which the speed ratios between a driving shaft and a driven shaft are governed by steplessly variable devices comprising at least two co-axial peripherally-beaded fixed-axis "discs" drive-connected to one of the shafts and axially loaded one toward the other, at least one obtusely-coned migratory "disc" penetrable between the fixed-axis discs and drive-connected to the other of said shafts, and mechanism whereby a selected degree of penetration of the migratory disc between the fixed-axis discs may be established and held so to maintain some selected ratio between the speeds of rotation of the driving and driven shafts.

The object of the present invention is to provide gear units of the kind indicated which, without sacrifice of efficiency of operation or of long working life, are mechanically simple and inexpensive by comparison with such gear units as available heretofore.

The invention consists in a gear unit of the kind indicated; characterised, in that, the mechanism whereby the migratory disc may be variously penetrated between the fixed-axis discs comprises a U-shaped swing bracket fulcrumed on the casing for the gear unit, a spline-shaft having its ends mounted in the arms of the swing bracket and having the migratory disc slidably keyed on it, a worm wheel sector fixed on a web portion of the swing bracket, a worm pinion borne in said casing and meshing said sector, and means for turning the pinion.

Examples of the invention are illustrated in the drawings herewith.

FIG. 1 is a section through one embodiment.

FIGS. 2 and 3 are sectional end elevations respectively taken on lines 2—2 and 3—3 in FIG. 1.

FIG. 10 is a fragmentary detail view which largely repeats matter shown in the earlier figures but differs in its showing of more than one migratory disc co-acting with more than two fixed-axis discs.

FIG. 11 is also a fragmentary detail view which largely repeats matter shown in the earlier figures but differs in its showing of means for applying an axially directed torque responsive loading to the fixed-axis discs.

FIG. 12 is a fragmentary section taken on line 12—12 in FIG. 11.

Figure 1:
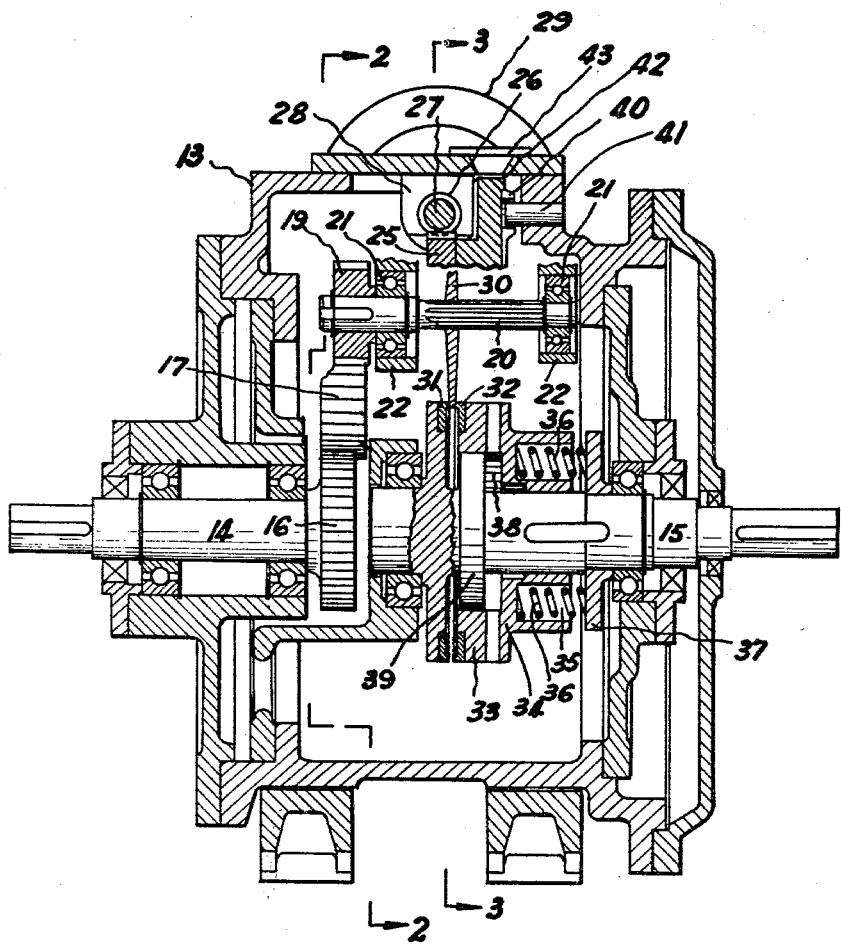
Figure 2:
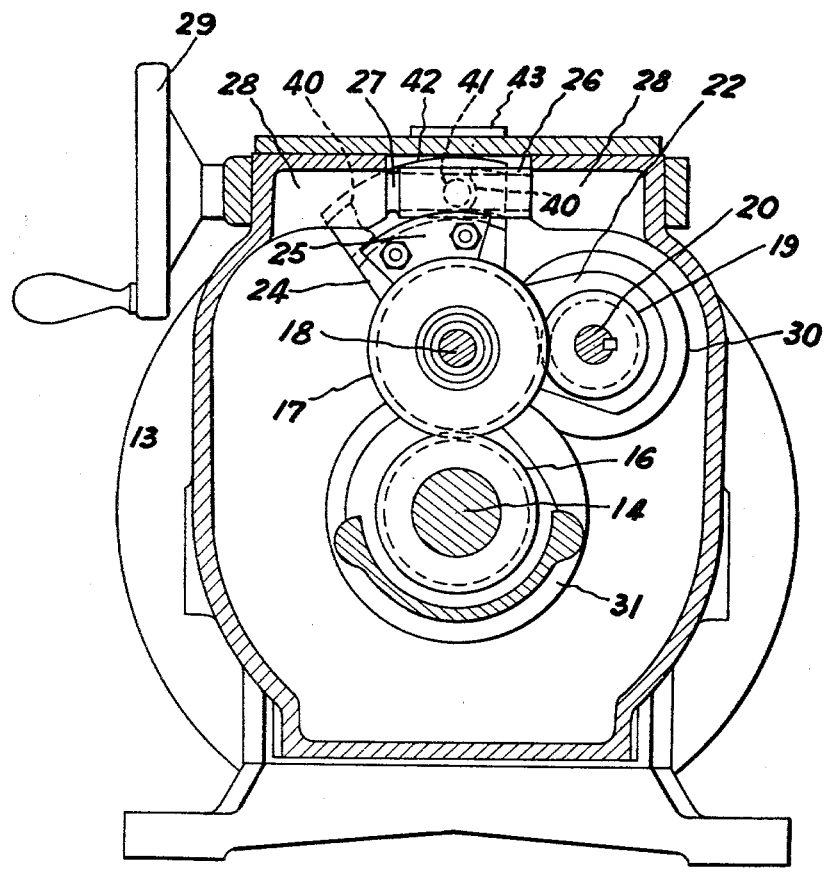
Figure 3:
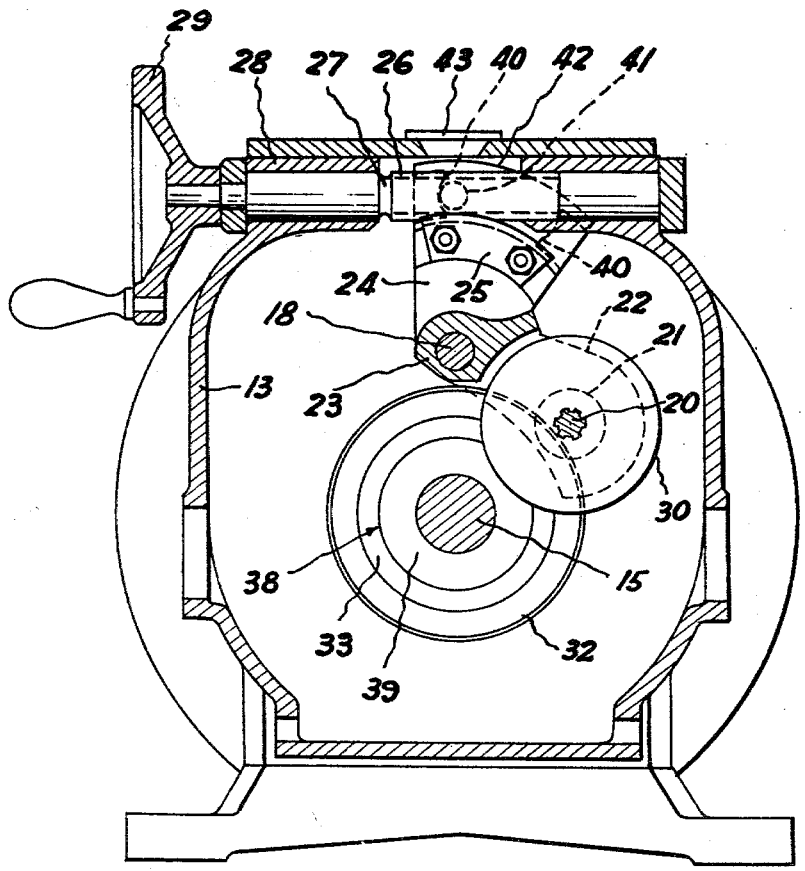

Referring to FIGS. 1 to 7, a casing 13 provides support for the bearings which carry driving shaft 14 and driven shaft 15. Shaft 14 has a main driving gear 16 fixed on it. This gear meshes an idler gear 17 rotatable on or with a fulcrum shaft 18 borne in suitable bearings (not shown) on or in the end walls of the casing 13. Gear 17 meshes a pinion 19 keyed on one end of spline shaft 20. This spline shaft runs in bearings 21 mounted in the arms 22 of a U-shaped swing bracket which is fulcrumed on shaft 18 by way of its boss-sleeve 23.

The swing bracket forms part of a bell-crank having a web portion 24. This portion has a sector 25 of a worm wheel fixed thereto by being integral with the web or rigidly secured thereto by bolting or otherwise. The worm wheel sector is meshed by a worm pinion 26 keyed or formed on an operating spindle 27 which extends through a bearing sleeve 28 in the wall of the gear unit casing; and, externally thereof is provided with a hand wheel 29.

In the illustrated embodiment of the invention now under discussion, there is only one migratory disc 30. The number of peripherally-beaded fixed-axis discs is, of course, one more than the number of migratory discs. The fixed-axis discs 31 and 32 are mounted upon the shaft 15 so that they may be moved apart upon increased intrusion of the migratory disc. The disc 31 constitutes a stationary abutment fixed on the shaft and the disc 32 has to be axially movable; and, it has to be spring loaded so to keep all of the discs firmly in driving engagement. It will be understood that the discs 31 and 32 have a considerable out-of-balance force imposed on them when driving takes place. This force tends to push the fixed-axis discs askew relative to the shaft 15. To overcome this disability the disc 32 is made in the form of an annular ring which can be bolted or otherwise fixed to a flange 33 on a spring housing 34. This housing contains pockets 35 for a number (nine for example) of equally spaced compression springs 36 able to bear against an abutment plate 37 fixed upon shaft 15.

The spring housing 34 is slidably keyed on the shaft 15 and it is hollowed out to provide a counterbore cavity 38 whereof the internal diameter is as great as is conveniently compatible with necessity to mount the end annular "disc" 32 on the spring housing. The interior of the counterbore cavity is a neat but sliding fit for the periphery of a circular mounting plate 39 fixedly mounted on the shaft 15. Thus, the spring housing with its very large diameter bearing at that end close to the disc 32 and its bearing upon the shaft 15 relatively remote from the disc carrying end thereof, gives to the spring housing sufficient firmness and stability of mounting on the shaft, even under heavy loading, as to limit skew displacement of the disc 32 to a degree which is inconsequential.

It will be appreciated that it is desirable for limits to be imposed upon the range of movement about its fulcrum of which the bell crank is capable, these limits corresponding to those of the amount by which the migratory disc 30 may penetrate between the fixed axis discs 31 and 32. The web 24 may be usefully employed to this end by providing it with a pair of stop blocks 40 able to bear against opposite sides of a stop pin 41 fixed in a wall portion of the casing 13.

Still another useful purpose may be served by the web 24 by providing it with an arcuate scale edge 42 graduated in terms of speed ratios (or other suitable indicia) viewable through a window 43 provided in the gear unit casing.

Figure 9:
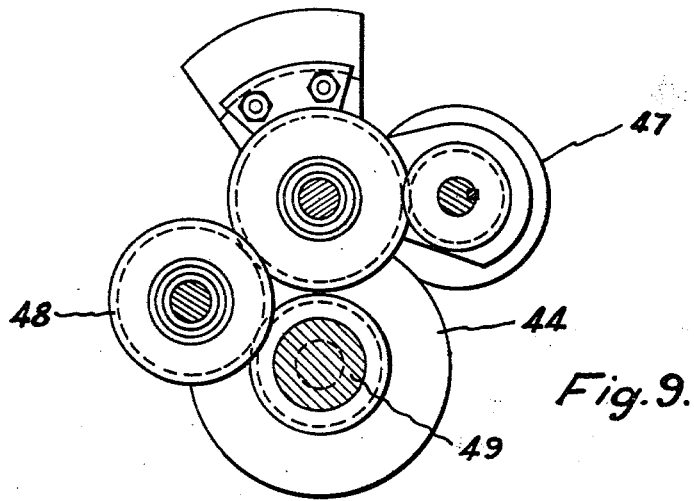
FIG. 9 is an incomplete sectional end elevation taken on line 9—9 in FIG. 8.
Figure 4:
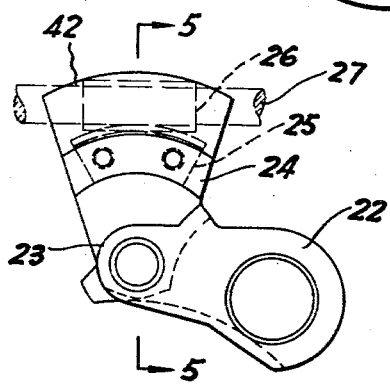
FIG. 4 is an end elevation of a swing bracket in the form of a bellcrank which also appears in FIGS. 2 and 3.
Figure 5:
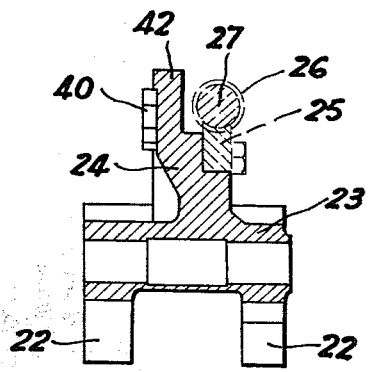
FIG. 5 is a sectional side elevation taken on line 5—5 in FIG. 4.
Figure 6:
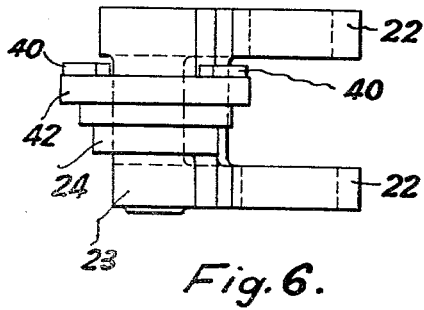
FIG. 6 is a plan projected from FIG. 4.
Figure 7:
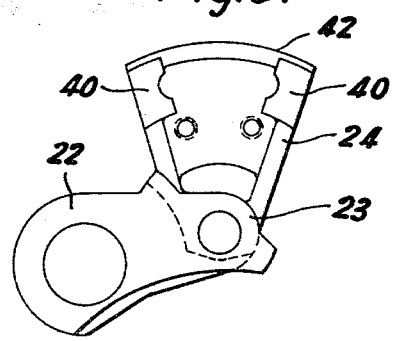
FIG. 7 is a view similar to FIG. 4 but looking on the opposite end of the bell-crank.
Figure 8:
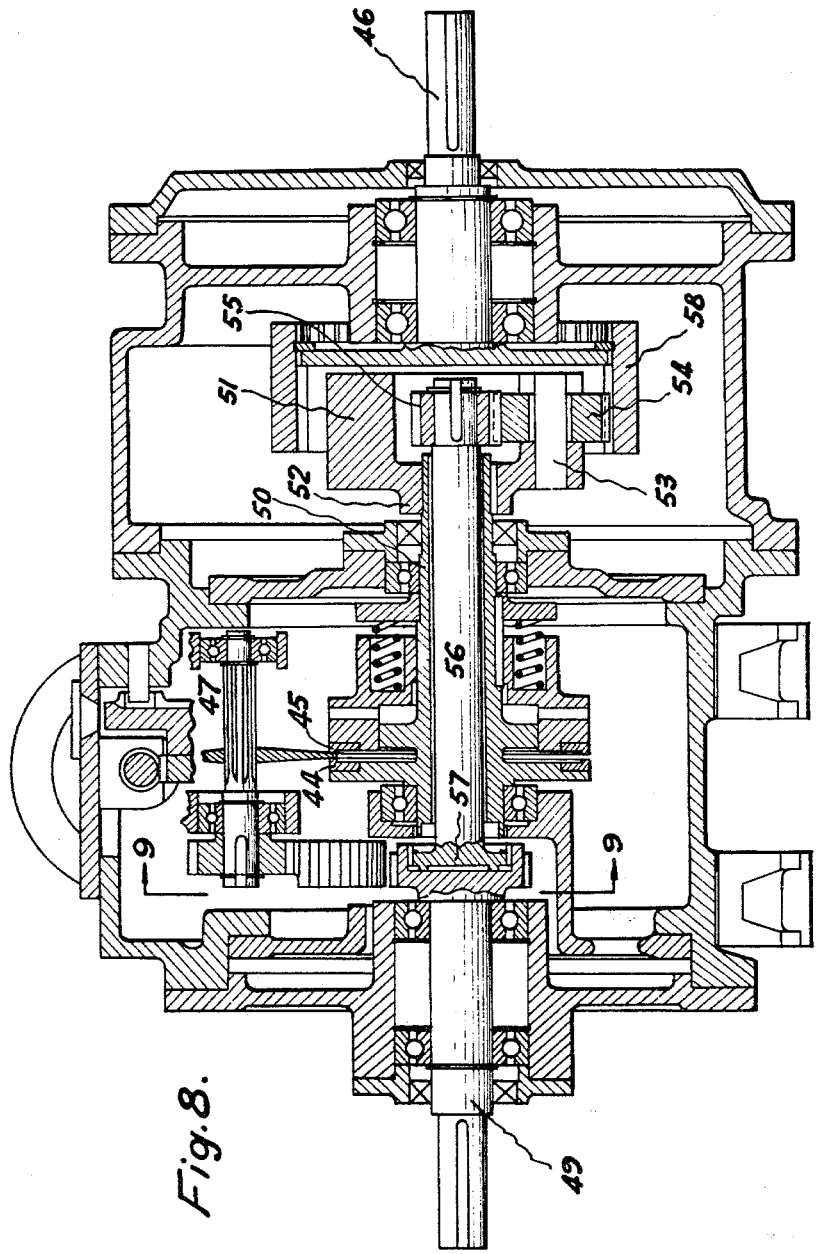
FIG. 8 is a view similar to FIG. 1 of modified arrangement of the invention.

The embodiment of the invention shown in FIGS. 8 and 9 of the drawings is virtually the same as that already described except for its inclusion of an epicyclic gear train by which driven shaft speeds may be varied over a wide range; extending, if desired, to zero driven shaft speed or negatively beyond zero into reverse.

In the arrangement of FIGS. 8 and 9, the peripherally-beaded fixed-axis discs 44 and 45 are drive connected to the driven shaft 46 by way of an epicyclic gear train. The inclusion of such a train enables the steplessly variable device to be adjunctive to the direct transmission line (as distinct from being included in it as in the arrangement subject of FIGS. 1 to 7) while still exercising full selectively variable control upon the transmission ratio by variation of the degree of restraint which the variable device is able to impose upon the planetary rotation of the planetary movable parts of the epicyclic gear train.

Referring to FIGS. 8 and 9, the fixed-axis discs 44 and 45, the migratory disc 47 and the driving arrangements therefor, and the means for selective variation of the amount by which the migratory disc may penetrate between the fixed-axis discs are all substantially as previously explained herein with the exception that an extra idler wheel 48 is included in the gear train by which the migratory disc 47 is drive-connected to the driving shaft 49. This extra idler is included because a sun pinion and a planetary gear carrier forming part of the epicyclic gear train (and referred to later herein) must necessarily rotate in the same direction otherwise the nature of the epicyclic gear train would not enable zero speed for the driven shaft to be reached.

A further difference in the present arrangement is that the shaft 50 which carries the fixed-axis discs 44 and 45 is tubular and has keyed upon it a planetary gear carrier 51 having a boss or hub 52 by which it is fixed upon the tubular output shaft 50. The carrier 51 provides bearings for two or more equally spaced axles 53 each of which carries a freely revoluble planetary gear 54. The planetary gears 54 mesh a central sun pinion 55 fixed on an extension shaft 56 which is housed inside the tubular shaft 50 and is coupled to the driving shaft 49, as indicated at 57, as a continuation of that shaft. The planetary gears 54 are surrounded by and meshed with an internally toothed ring gear 58 which is fixedly mounted on the driven shaft 46.

As previously indicated herein, the number of migratory discs may be greater than one and the fixed-axis discs correspondingly increased in number. An example of such plurality is indicated in FIG. 10. Referring to that figure, the number of migratory discs 59 is two, and the number of fixed-axis discs three, comprising outer discs 60 and 61 which to all intents and purposes are the same as those marked 31 and 32 in FIG. 1 (or 44 and 45 in FIG. 8) and additionally an intermediate disc 62 which is peripherally-beaded on both of its faces.

Referring to FIGS. 11 and 12, it will be seen that the fixed-axis discs 63 and 64 are drive connected to the driven shaft 65 by way of torque responsive means whereby increased axially directed loadings may be applied to the fixed-axis discs and the migratory disc penetrated therebetween. In this arrangement the fixed-axis discs 63 and 64 are mounted upon an intermediate shaft 66 which has slidably keyed on it a thrust plate 67 which acts as an abutment plate relative to springs 36a in the same manner as the abutment plate 37 shown in FIG. 1. The thrust plate 67 has recesses 68 therein, the floors of which are formed as oppositely directed ramps extending circumferentially of the thrust plate. A similar thrust plate 69 furnished with similar recesses 70 is freely revolubly mounted relative to shaft 66 but is keyed to the driven shaft 65 by way of teeth 71 on its periphery which slidably engage mating teeth formed inside the rim of a cup 72 integral with or otherwise fixed relative to the driven shaft 65. The thrust plate 69, while freely rotatable relative to the intermediate shaft 66 is restrained against movement axially of that shaft by a thrust bearing 73. Between the two thrust plates 67 and 69, a race plate 74 is provided as a locator for thrust balls 75 which fit within the paired recesses 68 and 70 as shown more particularly in FIG. 12.

In use, when the loading on the driven shaft 65 increases, it tends to slow down that shaft so that the thrust plate 69 tends to turn relative to thrust plate 67. This causes the balls 75 to ride upon the ramped portions of the recesses 68 and 70 thus tending to push the thrust plates 67 and 69 apart. Thus the axially directed loading on the springs 36a is augmented so to increase the bearing pressure with which the fixed-axis discs 63 and 64 engage the migratory disc penetrated therebetween.

It will be understood that the driving and driven shafts of any of the embodiments herein described, are so named and referred to as a matter of descriptive convenience; since, in any of the embodiments, the "driven" shaft may be used as a power input or driving shaft and in such case the "driving" shaft becomes a power output or driven shaft.

I claim:
1. In a power-transmission gear unit of the kind in which the speed ratios between a driving shaft and a driven shaft are governed by steplessly variable devices comprising at least two co-axial peripherally-beaded fixed-axis discs drive-connected to the driven shaft and axially loaded one towards the other, at least one obtusely-coned migratory disc penetrable between the fixed-axis discs and drive-connected to the driving shaft, and mechanism whereby a selected degree of penetration of the migratory disc between the fixed-axis discs may be established and held: the combination comprising, a swing bracket in the form of a bell-crank fulcrumed on the casing for the gear unit and incorporating a pair of co-directed webs and a third web angularly splayed from said co-directed webs, a spline-shaft having its two ends respectively mounted in said co-directed webs and having said migratory disc keyed thereon, a worm wheel sector fixed on said third web, a worm pinion borne in said casing and meshing said sector, means for turning said pinion, a first fixed-axis disc fixed on the driven shaft, a second fixed-axis disc axially movable along the driven shaft, a spring housing whereon the second disc is fixed which is slidably keyed on said driven shaft and has a counterbore opening to one end face and a plurality of spring pockets opening to its opposite end face, an abutment plate fixed on said driven shaft, springs in said pockets which bear against said abutment plate and urge said second disc towards said first disc, and a mounting plate fixed on said driven shaft which slidably but neatly fits inside said counterbore.

2. In a power-transmission gear unit of the kind in which the speed ratios between a driving shaft and a driven shaft are governed by steplessly variable devices comprising at least two co-axial peripherally-beaded fixed-axis discs drive-connected to the driven shaft and axially loaded one towards the other, at least one obtusely-coned migratory disc penetrable between the fixed-axis discs and drive-connected to the driving shaft, and mechanism whereby a selected degree of penetration of the migratory disc between the fixed-axis discs may be established and held: the combination comprising, a U-shaped swing bracket fulcrumed on the casing for the gear unit, a spline-shaft having its two ends respectively mounted in the arms of the swing bracket and having the migratory disc slidably keyed thereon, a worm wheel sector fixed on a web portion of the swing bracket, a worm pinion borne in said casing and meshing said sector, means for turning said pinion, an intermediate shaft borne in said casing in axial alignment with the driven shaft, a first fixed-axis disc fixed on said intermediate shaft, a second fixed-axis disc axially movable along said intermediate shaft, a spring housing whereon the second disc is fixed which is slidably keyed on said intermediate shaft and has a plurality of spring pockets opening to its end face remote from said first disc, a first thrust plate slidably keyed on said intermediate shaft, springs in said pockets which bear against said first thrust plate, a second thrust plate rotatably mounted on but axially restrained relative to said intermediate shaft and slidably keyed to said driven shaft, circumferentially ramped recesses in the mutually adjacent faces of said thrust plates, and thrust balls located within said recesses.

3. A gear unit according to claim 2 wherein said spring housing has a counterbore opening to its end face adjacent said first fixed-axis disc, and wherein a mounting plate is included which is fixed on said intermediate shaft and which slidably but neatly fits inside said counterbore.

4. In a power-transmission gear unit of the kind in which the speed ratios between a driving shaft and a driven shaft are governed by steplessly variable devices comprising at least two co-axial peripherally-beaded fixed-axis discs drive-connected to the driven shaft and axially loaded one towards the other, at least one obtusely-coned migratory disc penetrable between the fixed-axis discs and drive-connected to the driving shaft, and mechanism whereby a selected degree of penetration of the migratory disc between the fixed-axis discs may be established and held: the combination comprising, a U-shaped swing bracket fulcrumed on the casing for the gear unit, a spline-shaft having its two ends respectively mounted in the arms of the swing bracket and having the migratory disc slidably keyed thereon, a worm wheel sector fixed on a web portion of the swing bracket, a worm pinion borne in said casing and meshing said sector, means for turning said pinion, a tubular shaft borne in said casing concentrically about said driving shaft, a first fixed-axis disc fixed on said tubular shaft, a second fixed-axis disc axially movable along said tubular shaft, a spring housing whereon the second disc is fixed which is slidably keyed on said tubular shaft and has a plurality of spring pockets opening to its end face remote from said first disc, an abutment plate fixed on said tubular shaft, springs in said pockets which bear against said abutment plate and urge said second disc towards said first disc, an epicyclic gear train including a plurality of planet gears through which said driving shaft is gear-connected to said driven shaft, and a carrier for said planet gears keyed on said tubular shaft.

5. A gear unit according to claim 4 wherein said spring housing has a counterbore opening to its end face adjacent said first fixed-axis disc, and wherein a mounting plate is included which is fixed on said tubular shaft and which slidably but neatly fits inside said counterbore.

References Cited by the Examiner

UNITED STATES PATENTS

| | | | |
|---|---|---|---|
| 866,186 | 9/07 | Brush | 74—199 |
| 1,859,502 | 5/32 | Erban | 74—208 X |
| 2,583,496 | 1/52 | Rougelot | 74—199 |
| 2,675,713 | 4/54 | Acker | 74—208 X |
| 2,815,670 | 12/57 | Jorgensen | 74—199 |
| 3,006,206 | 10/61 | Kelley et al. | 74—208 X |
| 3,060,758 | 10/62 | Kano | 74—199 |

FOREIGN PATENTS 1,034,943   7/58   Germany.

DON A. WAITE, *Primary Examiner.*

BROUGHTON G. DURHAM, *Examiner.*